United States Patent
Fletcher et al.

[11] 3,899,696
[45] Aug. 12, 1975

[54] ELECTRIC POWER GENERATION SYSTEM DIRECTLY FROM LASER POWER

[76] Inventors: James C. Fletcher, Administrator of the National Aeronautics and Space Administration, with respect to an invention of Katsunori Shimada, Pasadena, Calif.

[22] Filed: Mar. 27, 1974

[21] Appl. No.: 455,165

[52] U.S. Cl. .............................. 310/4; 331/DIG. 1
[51] Int. Cl.² ...................................... H01V 45/00
[58] Field of Search ....... 310/4, 10, 11; 331/DIG. 1; 322/2

[56] References Cited
UNITED STATES PATENTS

| | | | |
|---|---|---|---|
| 2,902,618 | 9/1959 | DeLany et al. | 310/4 X |
| 2,980,819 | 4/1961 | Feaster | 310/4 |
| 3,191,076 | 6/1965 | Huber et al. | 310/4 |
| 3,218,196 | 11/1965 | Jensen et al. | 310/4 X |
| 3,234,411 | 2/1966 | Klein | 310/4 |
| 3,300,660 | 1/1967 | Bensimon | 310/4 |
| 3,467,840 | 9/1969 | Weiner | 310/4 |
| 3,748,505 | 7/1973 | Lavarini | 310/11 |

Primary Examiner—Donovan F. Duggan
Attorney, Agent, or Firm—Monte F. Mott; Paul F. McCaul; John R. Manning

[57] ABSTRACT

A pool of liquid cesium is spaced apart from a collector in an enclosed vessel. A laser beam is directed to the liquid cesium pool. The beam is focused to provide sufficient laser power density at the liquid cesium surface to vaporize some of the liquid cesium and ionize the vaporized cesium, and thereby form cesium ions and free electrons. The work function of the collector is different from that of cesium. When the work function is higher, the formed ions are attracted to the collector and the electrons are attracted by the liquid cesium, while the electrons and ions are respectively attracted by the collector and liquid cesium respectively when the work function of the collector is less than that of cesium. Thus, a potential difference is generated by the liquid cesium pool and the collector, sufficient to apply electric power to a load. The collector is held at a higher temperature than the liquid cesium to repel any neutralized cesium ions at the collector surface and any vaporized cesium atoms which are not ionized by the laser beam from the collector in order to facilitate the flow of ions or electrons thereto.

13 Claims, 3 Drawing Figures

PATENTED AUG 1 2 1975　　　　　　　　　　　　　3,899,696
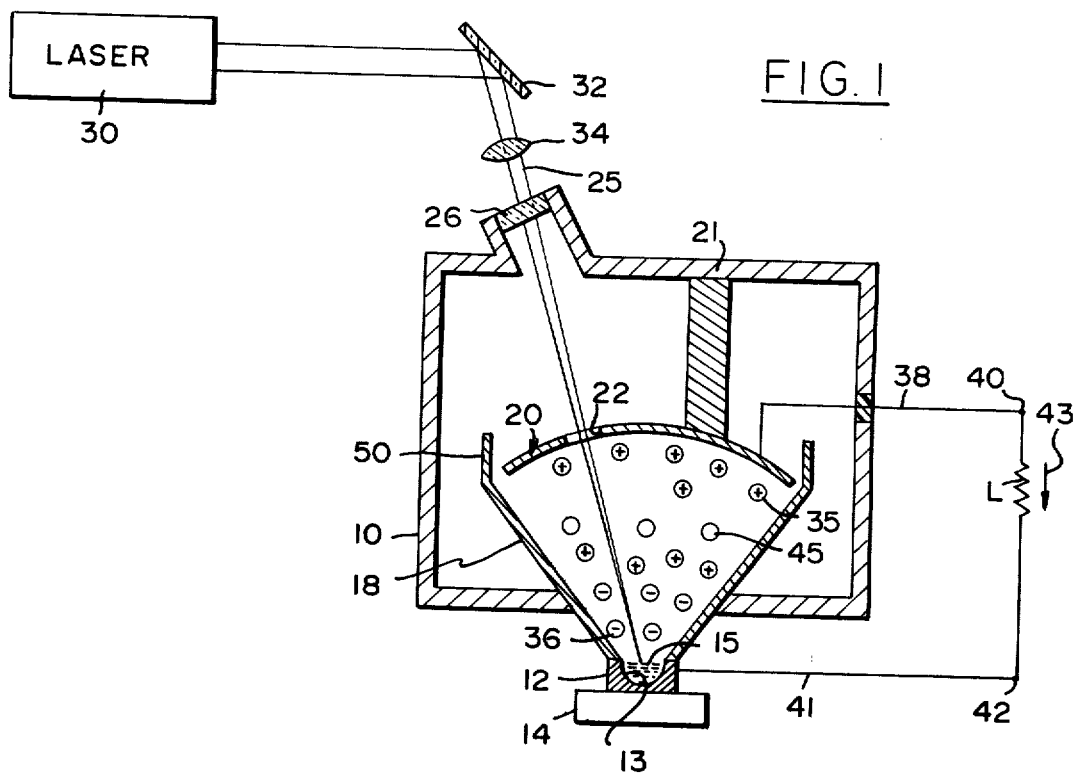
FIG. 1
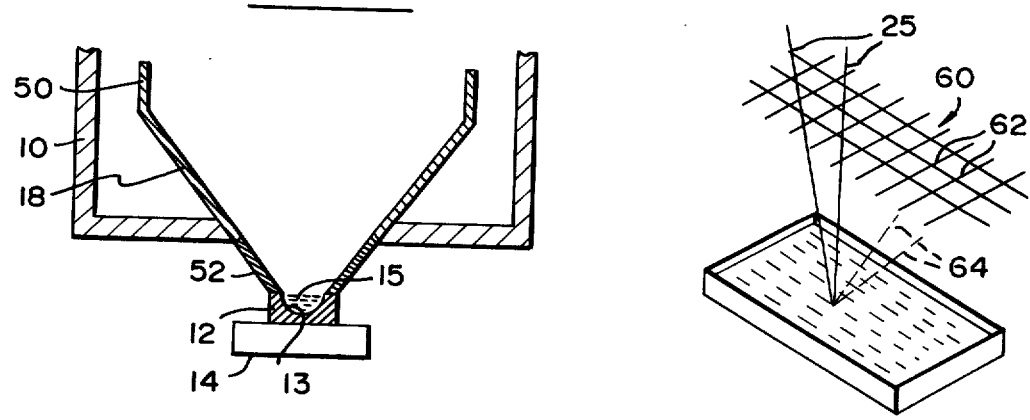
FIG. 2
FIG. 3

ELECTRIC POWER GENERATION SYSTEM DIRECTLY FROM LASER POWER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

The present invention is generally directed to power generation, and more particularly, to a system for extracting electric power directly from laser power.

2. Description of the Prior Art:

There are many applications in which electric power is required at remote sites, at which conventional electrical power generating means are either not available or cannot be employed. For example, in space vehicles, such as large orbiters or space probes, other than conventional electric power generating means such as those used on Earth, are employed to provide the necessary electric power. These include panels of solar cells. The panels have large surfaces since each cell produces a small power. They are often subject to failure due to solar radiations and/or damage by striking meteors or other space particles.

The great advances made in recent years in the field of lasers contributed to the ability of producing high energy laser beams which can be directed to remote sites, including vehicles in space. It would be a significant advance of the state of the art to be able to convert laser energy directly into electric power with reasonable efficiency.

OBJECTS AND SUMMARY OF THE INVENTION

It is a primary object of the present invention to provide a system for converting laser energy directly into electric power.

Another object of the present invention is to provide a system which consumes no substance during the conversion of laser energy directable thereto from a remote location directly into electric power.

These and other objects of the invention are achieved by providing a converter consisting of an emitter in the form of a pool of cesium and a collector, which is spaced apart from the emitter in a vacuum chamber. The collector is maintained at a higher temperature than the cesium. Laser energy is directed to the cesium to vaporize and ionize it into cesium ions or simply ions and free electrons. The collector may be designed or controlled, as will be explained hereinafter, to attract either the ions or the electrons. When designed or controlled to attract the ions, the collector collects the formed ions while the electrons return to the cesium. As a result, the collector is at a generated positive potential with respect to the cesium. An electric load can be connected across the collector and the cesium reservoir.

The temperature difference between the collector and the cesium is maintained to repel any neutral cesium atoms which reach the collector surface. The ions at the collector become recombined with electrons reaching the collector through the electrical load to form neutral cesium atoms. The neutral cesium atoms due to collector-emitter temperature difference drift to the colder cesium reservoir, where they recondense into liquid. When the collector is designed to attract electrons, the generated potential of the collector is negative with respect to the cesium. The collector is at a higher temperature than the cesium in order to repel any neutral cesium therefrom to the colder cesium reservoir.

The novel features of the invention are set forth with particularity in the appended claims. The invention will best be understood from the following description when read in conjunction with the accompanying drawings.

BRIEF DESCRIPTION OF THE DRAWINGS

FIG. 1 is a cross sectional side view of one embodiment of the invention;

FIG. 2 is a partial diagram of another embodiment; and

FIG. 3 is a partial diagram of yet another embodiment.

DESCRIPTION OF THE PREFERRED EMBODIMENTS

Attention is first directed to FIG. 1 which is generally a cross-sectional view of an embodiment of the invention which was reduced to practice and tested. It is shown consisting of a vacuum chamber or vessel 10 in which a block of copper 12, defining a cavity or reservoir 13 is shown, fixedly attached to a heat sinking member 14. The reservoir contains cesium, designated by numeral 15. The cesium reservoir 13 is maintained at about the melting temperature of cesium, e.g., about 29°C or about 302°K so that the cesium is in liquid form. Surrounding the cesium reservoir and in contact with the copper block 12 is a funnel-shaped member 18 of stainless steel, hereinafter referred to as funnel 18. It is in physical contact with copper block 12 and its temperature is maintained slightly higher than 302°K, and its electric potential is at the same potential as the cesium and the copper block 12. In the present invention, the pool of cesium 15 serves as an emitter, as will be described hereinafter.

Positioned above the cesium and spaced apart from the funnel 18 is a collector 20 which is shown as hemispherical in shape. In one embodiment reduced to practice, the collector is of molybdenum. The molybdenum collector 20, which is supported in the vessel 10 by a support member 21 defines an aperture 22. The function of the aperture is to enable a laser beam 25, which enters the vessel 10 through a window 26 to reach the cesium 15. The beam impinges the top surface of the cesium 15 somewhat obliquely so that laser energy is not reflected back along the incoming beam 25. The laser beam is provided by a laser 30 and is directed to the window 26 by a mirror 32. A condensing lens 34 is placed in the beam path to condense the beam, i.e., reduce its cross-sectional dimension at the cesium surface to a desired dimension, and thereby provide appropriate laser power density near and at the cesium surface.

The function of the laser beam is to first vaporize and then ionize the vaporized cesium with which the laser beam collides. Ionization is optimized by causing it to occur where both the cesium vapor density and the laser power density are high, thereby increasing the probability of collisions between the cesium vapor atoms and the laser photons. Also, ionization efficiency is increased by selecting a laser which provides a laser beam at a wavelength so that its photons have an equivalent electron energy which is close to or slightly higher than the cesium ionization energy, which is about 3.89 ev. Such selection reduces the number of collisions required for cesium ionization. A laser with a wavelength of about 3193A would have photons with an ionization equivalent energy of about 3.89 ev. However, such lasers with a large output power are presently not available. In one embodiment of the present invention, a ruby laser providing a laser beam with a wavelength of 6900A is employed. With such a laser beam about 3 photon-atom collisions are required to produce cesium ionization.

As the cesium is vaporized and ionized, ions and free electrons are produced in the space between collector 20 and the cesium 15. The ions are represented by the circles with the + signals, and are designated by numeral 35, and the electrons are represented by circles with the − sign and are designated by numeral 36. Since molybdenum whose temperature is maintained higher than that of the cesium pool has a work function which is higher than that of cesium, the ions tend to drift to the molybdenum collector 20, while the electrons tend to return to the cesium 15. Thus, the collector 20 becomes positively charged with respect to the cesium 15. As shown in FIG. 1, the collector 20 is connected by an electrically conductive wire 38 to an external terminal 40, while the copper block 12 which is at the cesium potential, is connected by a wire 41 to another external terminal 42. Due to the generated potential difference between the collector 20 and the cesium 15 electric power can be provided to an electric load L connected across the terminals 40 and 42.

In FIG. 1, arrow 43 represents the conventional direction of current flow although, as is appreciated, the electron flow direction is in the opposite direction, i.e., from the cesium 15 through the load L to the collector 20. Thereat, the electrons recombine with the cesium ions to form neutral cesium atoms. Since the collector 20 is much hotter than the cesium in reservoir 13, the recombined neutral cesium atoms tend to drift to the colder funnel 18 and the cesium reservoir 13 in block 12 which are kept at about the sample temperature. These atoms upon striking the funnel 18, block 12 or the cesium 15, recondense into cesium liquid. Thus, the neutral cesium atoms return to the reservoir in liquid form, for subsequent vaporization by the laser beam.

Under ideal conditions, all the cesium which is vaporized by the laser beam should be ionized into ions and free electrons. However, in practice, this was found not to be the case. Some of the vaporized cesium atoms are not ionized and remain as neutral cesium atoms, designated in FIG. 1 by circles numbered 45. A substantial number of these atoms drift to and reach the inner surface of the collector 20. This is most undesirable since the presence of the excess neutral cesium atoms reduces the work function of the collector.

This undesirable effect is overcome to a great extent by maintaining a high temperature differential between the collector 20 and the cesium 15. The high temperature of the collector 20 tends to repel the neutral cesium away from it toward the colder funnel 18 cesium reservoir B. The collector 20 is at least partially heated by the laser energy which is reflected by the outer surface of the cesium 15 toward the collector. If necessary, an external heater may be used to raise the collector to the desired temperature.

In the embodiment reduced to practice, the work function of the molybdenum collector 20 with neutral cesium at its surface was found to be $\phi_c = 3.2v$. With such a collector its temperature $T_c$ was held at about 3 times the cesium temperature $T_{cs}$, i.e., $T_c/T_{cs} \approx 3$. With a cesium temperature of about 302°K, the collector temperature was about 906°K.

In the particular embodiment, laser 30 was a ruby laser providing 0.69 micron (6900A) radiation at a maximum of 1 joule per pulse, 40 pulses per minute. During the experiment, the laser beam was focused down to about 1 mm with a peak power density of 1kw/mm$^2$ or about 100kw/cm$^2$. The arrangement produced very significant current pulses per laser pulse.

The cesium and the collector can be thought of as a two electrode converter wherein the cesium acts as an emitter of ions and free electrons. In the previously described embodiment, the molybdenum collector due to its higher work function than the cesium work function acts as an ion collector. As a result, the generated potential difference is one in which the collector is at a higher potential than the cesium. The invention, however, is not intended to be limited thereto. Instead of a collector with a work function higher than that of cesium, a collector with a work function lower than that of cesium can be used. In such a case, the free electrons 36 rather than the ions will be attracted to the collector and the ions will be attracted by the pool of cesium. Thus, the collector will be at a lower generated potential than the cesium. The electrons, returning from the collector through the electric load L to the cesium, will recombine with the ions in the cesium pool to produce neutral cesium atoms. It should be pointed out that in such an embodiment, i.e., one in which the collector is an electron collector, the collector should also be maintained at a temperature higher than the cesium 15. This is necessary to repel the neutral cesium atoms, which are not ionized by the laser beam from the collector surface and thereby facilitate the flow of electrons to the collector.

The cesium vaporized by the laser beam but which is not ionized, i.e., the neutral cesium atoms 45 tend to move radially outwardly from the point of impact of the laser beam with the cesium 15 at high velocity. In order to prevent these atoms from escaping from the space between the two electrodes, i.e., the collector 20 and the cesium pool 15, the outer periphery of the funnel 18 is preferably shaped to extend outwardly about the collector 20 yet spaced therefrom, as designated by numeral 50. These cesium atoms forming the non-ionized cesium vapor when striking the funnel 18 tend to condense back into liquid cesium since the funnel 18 is at the ceium pool temperature or thereabout which is above the cesium melting temperature, e.g., 302°K, but considerably below the cesium's boiling temperature.

Due to the shape of the funnel 18, any cesium vapor which condenses thereon into liquid form tends to flow back into the reservoir 13.

The condensation of non-ionized cesium vapor to liquid form and its return to the reservoir 13 may be further facilitated by producing a temperature differential between the funnel 18 and the reservoir block 12. This may be achieved by truncating the funnel 18 as shown in FIG. 2 and connecting it to the block 12 by means of an inward pointing truncated cone-shaped member 52. Assuming that the block 12 and therefore the cesium pool is at 302°K by maintaining the funnel 18 at a higher temperature, e.g., 402°K, a temperature gradient is created across member 52. Since the funnel is at a higher temperature than the reservoir 13, the flow of any cesium liquid condensed in the funnel from the funnel to the reservoir is increased due to the tendency of liquid to flow to the colder region.

In the embodiment reduced to practice, the collector diameter was about 1cm and the distance from the cesium pool 15 to the highest point of the collector 20 was about 0.5cm. In one operation, a laser power density of about 1 kw mm$^{-2}$ was produced at the cesium surface. Although prior theoretical studies indicate that very high laser power density is required to vaporize and particularly, ionize the cesium, the density of 1 kw mm$^{-2}$ was found to be high. It vaporized too much of the cesium thereby producing too many neutral cesium atoms which did not become ionized. Thus, it indicates that lower laser power densities can be employed. As previously pointed out for optimum operation, the ionization should take place close to the cesium surface where the laser power density is high and the cesium vapor density is also high in order to increase the probability of photon-atom collisions, and thereby maximizes the ionization of the vaporized cesium.

As previously stressed, the collector 20 has to be at a high temperature. Clearly, this can be achieved by externally heating the collector. However, such external heating would require a source of heat. If electric power is required for such heating the net available electric power from the present system would be reduced. Preferably, the collector should be designed and positioned so that most if not all of the laser energy which is not needed for the vaporization and ionization of the cesium is reflected by the cesium as represented by dashed lines 64. For example, with a mesh opening of 90%, 10% of the laser beam is blocked off by the mesh. Assuming 50% reflection, 5% of the laser beam is used directly to heat up the mesh, while 5% is reflected to the vessel 10. Of the 90%, laser beam power reaching the cesium, some is reflected back to the mesh 60 to further heat it, while some will pass through the mesh to the vessel walls. For applications to conversion of laser energy having a large average power output, the embodiment with the mesh-shaped collector is particularly attractive. The mesh openings can be chosen to permit only the portion of the laser beam power necessary for cesium vaporization and ionization to pass therethrough. The rest of the laser power may be used to heat the mesh collector, taking into account the portion of the laser power which is reflected by the mesh collector.

Although particular embodiments of the invention have been described and illustrated herein, it is recognized that modifications and variations may readily occur to those skilled in the art and consequently, it is intended that the claims bbe interpreted to cover such modifications and equivalents.

What is claimed is:

1. A system comprising:
 a source of liquid cesium;
 a laser for providing a laser beam;
 first means in the path of said laser beam for directing said beam to said liquid cesium, to vaporize some of said liquid cesium and to ionize at least some of said vaporized cesium into cesium ions and electrons by the collisions between the beam photons and the vaporized cesium atoms; and
 collector means electrically insulated from said liquid cesium source and spaced apart therefrom, said collector means having a work function which is different from the work function of said liquid cesium whereby either said ions or said electrons, formed when said cesium vapor is ionized, are attracted to said collector means, thereby generating a potential difference between said liquid cesium and said collector means, said laser beam ionizing only part of the cesium vaporized by said laser beam, whereby some neutral cesium atoms are present between said liquid cesium and said collector means, the latter being at a temperature which is sufficiently higher than said liquid cesium source, to repel the neutral cesium atoms from said collector means toward said liquid cesium source.

2. The system as described in claim 1 wherein said collector means is spaced apart from said source and the laser beam is directed to said liqiud cesium so that at least part of the laser beam reflected by said liquid cesium is directed to and impinges said collector means, said source of liquid cesium being at a temperature of not less than the melting temperature of cesium on the order of several hundred degrees K.

3. The system as described in claim 1 wherein the work function of said collector means is higher than the work function of cesium, whereby said collector means attracts the cesium ions, and said first means include means for focusing said beam at or near the top surface of the liquid cesium in said source.

4. The system as described in claim 3 wherein said collector means is spaced apart from said source and the laser beam is directed to said liquid cesium so that at least part of the laser beam reflected by said liquid cesium is directed to and impinges said collector means.

5. The system as described in claim 1 wherein the work function of said collector means is lower than the work function of cesium, whereby said collector means attracts free electrons formed when said vaporized cesium is ionized by said laser beam and said first means include means for focusing said beam at or near the top surface of the liquid cesium in said source.

6. The system as described in claim 5 wherei; said collector means is spaced apart from said source and the laser beam is directed to said liquid cesium so that at least part of the laser beam reflected by said liquid cesium is directed to and impinges said collector means.

7. A system comprising:
 a source of liquid cesium;
 a laser for providing a laser beam;
 first means in the path of said laser beam for directing said beam to said liquid cesium to vaporize some of said liquid cesium and to ionize at least some of said vaporized cesium into cesium ions and electrons by the collisions between the beam photons and the vaporized cesium atoms; and
 collector means electrically insulated from said liquid cesium source and spaced apart therefrom, said collector means having a work function which is different from the work function of said liquid cesium whereby either said ions or said electrons, formed when said cesium vapor is ionized, are attracted to said collector means, thereby generating a potential difference between said liquid cesium and said collector means, wherein said liquid cesium is at a temperature of not less than the melting point of cesium on the order of several hundred degrees K, and said collector means is at a temperature higher than the temperature of the liquid cesium, to repel therefrom any neutral cesium atoms present between said source and said collector means, and said laser beam is directed by said first means to said liquid cesium source through said collector means.

8. The system as described in claim 7 wherein said first means include means for focusing said laser beam at or near the upper surface of said liquid cesium, said laser beam ionizing only part of the cesium vaporized by it.

9. The system as described in claim 8 wherein the work function of said collector means is higher than the work function of cesium, whereby said collector means attracts the cesium ions, and said first means include means for focusing said beam at or near the top surface of the liquid cesium in said source.

10. The system as described in claim 7 wherein the collector means is spaced from said source a distance of not less than one millimeter, and positioned with respect to said source whereby at least part of the laser beam reflected by said liquid cesium is directed to and impinges said collector means.

11. The system as described in claim 10 wherein said collector means is mesh-shaped with a portion of the beam directed to said source being intercepted by said collector means.

12. The system as described in claim 11 wherein said first means include means for focusing said laser beam at or near the upper surface of said liquid cesium, said laser beam ionizing only part of the cesium vaporized by it.

13. The system as described in claim 12 wherein the work function of said collector means is higher than the work function of cesium, whereby said collector means attracts the cesium ions, and said first means include means for focusing said beam at or near the top surface of the liquid cesium in said source.

* * * * *